UNITED STATES PATENT OFFICE.

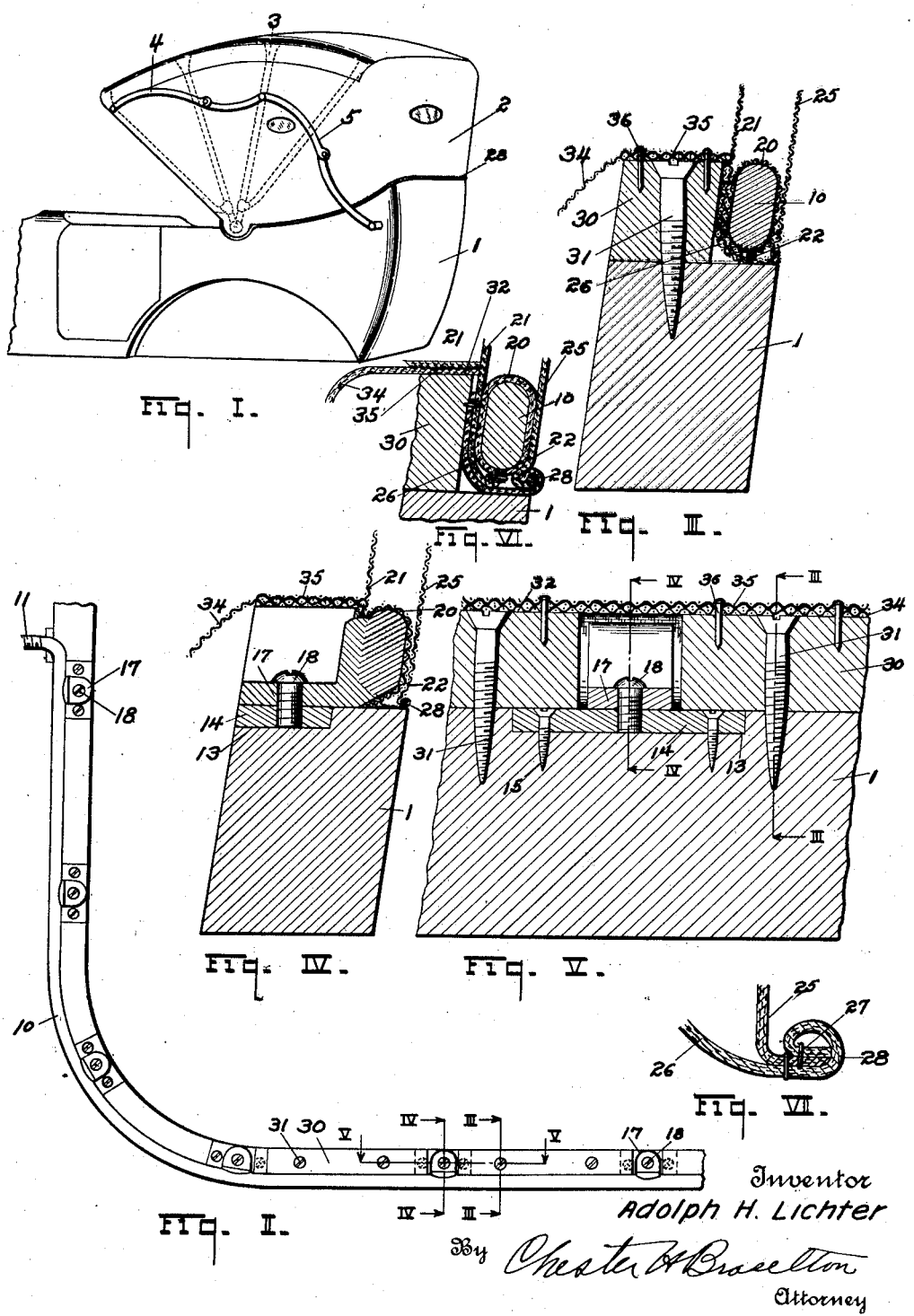

ADOLPH H. LICHTER, OF TOLEDO, OHIO.

VEHICLE-TOP.

1,389,671.     Specification of Letters Patent.     Patented Sept. 6, 1921.

Application filed July 22, 1918. Serial No. 246,226.

*To all whom it may concern:*

Be it known that I, ADOLPH H. LICHTER, a citizen of the United States, residing at Toledo, county of Lucas, and State of Ohio, have invented certain new and useful Improvements in Vehicle-Tops, of which I declare the following to be a full, clear, and exact description.

This invention relates to vehicles of the type in which a top, comprising a frame and a flexible portion is attached to the body of the vehicle, the object of the invention being to provide a novel combination thereof including means for securing the top to the body in such a manner that the top may be removed from the body when desired, but at the same time when attached thereto the entire construction has a finished appearance. Thus the invention has for its object to provide a novel arrangement of this character, particularly desirable in certain types of vehicle bodies, such as those with victoria tops, for example, although of course not limited thereto, and to overcome certain disadvantages of prior construction by reason of the finished appearance obtained, the particularly efficient joint secured thereby, and the means whereby the same can be disconnected to permit the vehicle top to be removed from the body, if so desired.

Moreover, it is a feature of the present construction to provide means whereby a joint between the top and the body portion of a vehicle when viewed from the interior thereof has an equally finished appearance as when viewed exteriorly of the vehicle.

Further objects of this invention relate to the particular type of joint utilized herein, although it is to be understood that this invention is in no way limited to this particular type, as it is obvious that various other constructions may be used with equal advantage. However, the joint illustrated herein has inherent advantages in the construction thereof, certain features of which include means for securing both the frame portion and the flexible portion of a top to a vehicle body, means for securely clamping and uniting the flexible portion to the body portion of the vehicle as well as means for concealing the joint thus formed between the top and the body.

Further objects of the invention relate to various details of construction hereinbelow more specifically described and pointed out in the appended claims.

A structure constituting a preferred embodiment of my invention is illustrated in the accompanying drawings, forming a part of this specification, in which:

Figure I is a perspective view showing a vehicle body and top attached thereto according to this invention.

Fig. II is a top plan view of portions of one means, shown merely by way of illustration, for joining the vehicle top and body in the manner indicated above.

Fig. III is a cross sectional view of line III—III of Fig. II.

Fig. IV is a sectional view on the line IV—IV of Fig. II.

Fig. V is a sectional view on the line V—V of Fig. II.

Figs. VI and VII illustrate details of the construction, somewhat enlarged for clearness.

Referring to Fig. I, there is shown a vehicle body portion 1 and a top portion 2, which, in the type illustrated, is provided with bows 3 and collapsible braces 4 and 5, as will be readily understood by those skilled in the art.

The means whereby the flexible portion of the top 2 and the frame portion 3 thereof is permanently attached to the body portion 1 of the vehicle in such a manner that the frame may be removed therefrom when desired, constitutes one of the main features of this invention. While various means might be employed to attain these ends, there is shown herein a rod 10 adapted to be secured to the top edge of the vehicle body and extending along a portion of either side thereof, as well as across the back, terminating in offset projections 11 to form pivots for the bows 3 of the frame portion of the top. At spaced intervals along the top edge of the body 1 recesses 13 are provided and within these recesses may be located plates 14, permanently secured to the body 1 by the wood screws 15. The rod 10 may be provided with lugs or ears 17 secured thereto in any desirable manner as, for example, by being welded, the same being spaced thereon at intervals corresponding to the intervals between the several plates 14 in the body 1. Ears 17 may be secured to plates 14 by a machine screw 18 as shown, thus attaching the rod 10 to the body portion 1 of the vehicle.

The flexible portion of the top is secured to or carries the rod 10, and the projections 11 of the rod are adapted to be positioned in the eyes of the pivots of the bows 3 and, if desired, the rod 10 may be provided with a flexible covering 20. If the flexible top in the particular type of top used is provided with a lining 21, the end of the lining 21 may be inserted between the two edges of the covering 20 which surrounds the rod 10 and the three stitched together by the stitching 22 as shown more fully in Fig. VI. The exterior flexible portion 25 of the top 2, usually composed of leather, may be provided along its lower edge with an extension or flap 26 likewise secured thereto by the stitching 27, as shown in Fig. VII. At the junction between the top portion 25 and the flap extension 26 the latter may be coiled as indicated to form a bead 28 in order to give the joint between the top and the body a still further degree of refinement of finished appearance. The flap 26 is brought around the rod 10 and secured to the lining 21, as shown, to secure the portion 25 to the rod 10, and hold the rod 10 with its covering 20 within the inner and outer flexible walls 21 and 25 of the top 2. The rod 10 thus inclosed within the flexible portions of the top 2 may be secured to the top edge of the body 1 by the screws 18, which, when screwed home, clamp the rod 10 to the body, with a portion of the flexible top 2 or an extension thereof in the flap 26 firmly held between the rod and the top edge of the body 1.

Extending between each of the ears 17 there may be placed a filler block 30 adapted to be secured by the screws 31 to the top of the body 1, the top thereof thus forming a flat portion 32 substantially flush with or on the same plane as the top portion of the rod 10, to which the fabric of the interior upholstery of the vehicle body may be secured as is clearly indicated in Fig. III. In this manner a ledge is formed adjacent to the upper edge of the body 1 of the vehicle, and within this ledge is located the rod 10 for securing top 2 to the body, and the joint between the top and body is concealed therein. As shown in Figs. III and IV, the upholstery covering 34 extends over onto the flat top portion of filler blocks 30, and over the covering 34 is located a strip 35 for binding the covering 34 to the filler blocks 30, for which purpose nails 36, for example, may be used. These features of construction described as illustrating one means for reducing my invention to practice may, of course, be widely varied without departing from the spirit and scope thereof.

It is believed that the manner of attaching and detaching the top to a vehicle body by means of the construction shown herein will be readily understood from the foregoing. The rod 10 is first located and secured to the top 2 in the manner pointed out and when the rod is properly positioned therein, the top 10 is mounted on the vehicle body 1 and the ears 17 of the rod 10 are clamped in position as heretofore indicated by use of the screws 18. The filler blocks 30 may then be screwed to the top edge of the body 1 in the manner shown in the drawing, whereupon the covering 34 and tape 35 of the interior upholstery of the vehicle body may be secured thereto in the manner just indicated.

To release the top 2 from the body 1, the tape 35 and covering 34 are removed adjacent the recesses or spaces, which may readily be found between the ends of the adjacent filler blocks 30, whereupon the screws 18 are removed to release the rod 10 free of the body 1, and thereupon the top 2 may be easily detached from the vehicle 1.

It is apparent that the space or ledge for the reception of the rod 10, formed by the body 1 and the filler blocks 30, could readily be made by cutting away a portion of the top of the body 1 without the use of separate filler blocks 30, the same being provided with recesses for the reception of the ears 17. Furthermore, it is apparent that the type of joint illustrated could readily be employed with a top having but a single exterior flexible portion 25 without the lining 21, that the separate extension or flap 26 might likewise be omitted, and that further modifications and re-arrangement of the parts could be readily devised by those interested.

Having thus described my invention, what I claim as new and desire to secure by Letters Patent, is:—

1. In a vehicle structure, a body portion provided with a recess along its upper edge, a member disposed within said recess shaped to conform to a portion of the upper edge of the body and provided with inwardly extending ears, a flexible top having one edge secured to said member whereby a weatherproof joint is afforded between the body and top, and means for securing the inwardly extending ears to the upper portion of the vehicle body.

2. In a vehicle structure, a body portion provided with a recess along its upper edge, a rod shaped to conform to a portion of the upper edge of the body and disposed within said recess and provided with inwardly extending ears, a top having one edge secured to the rod and forming with the body a weatherproof joint, plates seated within the upper edge of the body portion and arranged to register with the inwardly extending ears, and means for securing the inwardly extending ears to the plates.

3. In a device of the character described, a vehicle body provided with a shoulder along its upper outer edge, a vehicle top including a flexible portion having a border member secured to one edge thereof, and means for securing the border member upon the shoulder of the vehicle body substantially flush with the outer surface of the body to form a waterproof joint therewith.

4. In a device of the character described, a vehicle body having an upper edge, a vehicle top, a rod secured to one edge of the top, means for securing the rod to the upper edge of the vehicle body so as to be substantially flush with the outer surface of the body, and spacing blocks attached to the upper edge of the body and so arranged as to be substantially flush with the inner surface of the body and bear against the inner surface of the rod.

5. In a device of the class described, a body portion, a plurality of spacing blocks secured to the upper face of the body adjacent the inner edge thereof and terminating short of the outer surface of the vehicle body thus forming a recess upon the outer edge of the body, a top, and a rod attached to the edge of the top and secured to the upper edge of the vehicle body to lie within the recess above described.

6. In a device of the class described, a vehicle body, a rod adapted to fit upon a portion of the upper edge of the vehicle body and provided with a plurality of inwardly extending ears, means for securing the ears to the vehicle body, and filler blocks positioned between the inner edge of the body and the rod, and means for securing the filler blocks to the vehicle body.

7. In a vehicle body structure, the combination of the upper and lower sections of the body, said lower section having a ledge or recess along its upper outer edge, said upper section being formed of flexible material with a border member secured along its lower edge and disposed within said recess, whereby a closed joint is formed between said upper and lower sections.

8. The combination of a vehicle body and a collapsible top therefor, said body being provided with a ledge below its upper edge at the outer side thereof, said collapsible top having a border member secured along its lower edge and supported by said ledge whereby a closed joint is afforded between the body and top of the vehicle.

9. The combination of a vehicle body and a collapsible top therefor, said body being provided with a ledge below its upper edge at the outer side thereof, said collapsible top having a border member secured along its lower edge and disposed upon the body above said ledge whereby a closed joint is afforded between the body and top of the vehicle, and means for securing said border member to the body.

10. The combination of a vehicle body and a collapsible top therefor, said body being recessed along its upper edge, said collapsible top having a border member along its lower edge disposed within said recess, and means removably connecting said border member with said body.

11. The combination of a vehicle body, a top therefor, a border member secured to the lower edge of the top and disposed upon the upper edge of the body so as to be substantially flush with the outer surface of the body, means for securing said border member to said body, and means upon the upper edge of the body for concealing said securing means.

12. The combination of a vehicle body, a top therefor, a border member secured to the lower edge of the top and disposed upon the upper edge of the body adjacent the outer surface thereof, a plurality of spaced strips secured to the upper edge of the body inwardly of said border member, tongues connected with said border member and extended inwardly between the ends of said strips, means for securing said tongues to said body and finishing material forming a covering for said strips and the tongues lying between the spaced ends of the strips.

13. In combination, a vehicle body, a top therefor including a flexible cloth like portion, a rod concealed therein and having securing portions projecting therefrom and engaging the upper edge of the body, and means securing said projecting portions upon the body.

14. In combination, a vehicle body, having a ledge formed adjacent its upper extremity, a top for the body including a flexible cloth like portion, a border member concealed therein and disposed upon said ledge, and means connecting the border member with said body.

15. In combination, a vehicle body having a ledge formed upon its upper extremity, a top including inner and outer flexible members, a border member concealed between said flexible members and disposed upon said ledge and means connecting said border member with said body.

16. In combination, a vehicle body, a top therefor including inner and outer flexible portions, a border member concealed between said flexible portions and having projections extending therefrom, and means securing said projections upon said body.

In testimony whereof, I affix my signature.

ADOLPH H. LICHTER.